(12) United States Patent
Scheirer

(10) Patent No.: US 11,982,383 B2
(45) Date of Patent: May 14, 2024

(54) SECURING DEVICE FOR A FERRULE CLAMP

(71) Applicant: William W Scheirer, Schnecksville, PA (US)

(72) Inventor: William W Scheirer, Schnecksville, PA (US)

( * ) Notice: Subject to any disclaimer, the term of this patent is extended or adjusted under 35 U.S.C. 154(b) by 127 days.

(21) Appl. No.: 17/897,051

(22) Filed: Aug. 26, 2022

(65) Prior Publication Data

US 2023/0061560 A1  Mar. 2, 2023

Related U.S. Application Data

(60) Provisional application No. 63/238,440, filed on Aug. 30, 2021.

(51) Int. Cl.
  *F16L 3/10* (2006.01)
(52) U.S. Cl.
  CPC .................................. *F16L 3/1075* (2013.01)
(58) Field of Classification Search
  CPC ... F16L 3/1075; F16L 23/003; F16L 2201/20; F16L 35/00; F16L 41/04; E05B 67/383; F16K 35/06
  See application file for complete search history.

(56) References Cited

U.S. PATENT DOCUMENTS

| | | | | |
|---|---|---|---|---|
| 3,578,196 | A * | 5/1971 | Ender | B65D 55/14 |
| | | | | 215/207 |
| 4,428,395 | A * | 1/1984 | Bravo | B65D 55/14 |
| | | | | 137/364 |
| 9,618,134 | B2 * | 4/2017 | O'Brien | F16L 41/04 |
| 9,909,700 | B2 * | 3/2018 | O'Brien | F16K 35/06 |
| 2015/0360858 | A1 * | 12/2015 | Elson | E05B 73/00 |
| | | | | 70/14 |
| 2016/0201825 | A1 * | 7/2016 | O'Brien | F16L 35/00 |
| | | | | 70/177 |
| 2020/0400247 | A1 * | 12/2020 | Decker | F16K 35/06 |

* cited by examiner

*Primary Examiner* — Robert Sandy
*Assistant Examiner* — Rowland Do
(74) *Attorney, Agent, or Firm* — Barry Choobin; Patent 360

(57) ABSTRACT

A securing device for securing a wing nut type ferrule clamp installed on a ferrule, the securing device has a top and a hollow body that extends downwards from a periphery of the top. The hollow body has a front face and a rear face, the front face has an elongated hole configured to receive one end of the wing nut. A first cutout in the front face extends from the bottom of the hollow body and below the elongated hole. The first cutout has a width more than the width of the ferrule clamp. The rear face of the hollow body has a second cutout to receive an opposite end of the wing nut. Two flanges extend from opposite edges of the second cutout, wherein each of the two flanges has a hole. A shackle can pass through the two holes and limits the movement of the wing nut.

15 Claims, 2 Drawing Sheets

US 11,982,383 B2

SECURING DEVICE FOR A FERRULE CLAMP

CROSS-REFERENCE TO RELATED APPLICATIONS

This application claims priority from a U.S. Provisional Patent Appl. No. 63/238,440 filed on Aug. 30, 2021, which is incorporated herein by reference in its entirety.

FIELD OF INVENTION

The present invention relates to a securing device for a ferrule clamp, and more particularly, the present invention relates to a securing device for a wing nut-type ferrule clamp.

BACKGROUND

Wing nut type ferrule clamps are widely used to clamp together process tubing, fittings, hoses, and instruments. The wing-nut type clamps for ferrules are a quick and flexible way to change, clean, and/or inspect internally the components without the use of special tools or training.

The wing nut-type clamps are frequently uninstalled for inspecting and servicing the ferrules.

Over time with continuous use, the clamps are subjected to wear and tear. This results in the rotation and loosening of the clamps due to vibrations or oscillations of the general industrial process. Besides the need to routinely remove the clamps for servicing, over-tightening of the wingnuts can also hasten the wear and tear.

A desire is there a securing device for such clamps that prevent the rotation and/or loosening of the ferrule clamps.

SUMMARY OF THE INVENTION

The following presents a simplified summary of one or more embodiments of the present invention to provide a basic understanding of such embodiments. This summary is not an extensive overview of all contemplated embodiments and is intended to neither identify critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a securing device for ferrule clamps.

It is another object of the present invention that the securing device provides a labeling surface.

It is still another object of the present invention that the securing device can prevent undesired tampering with the clamp.

It is a further object of the present invention that the securing device can prevent frequent replacement of the clamps.

It is yet another object of the present invention that the securing device can be easily and quickly removed.

In one aspect, disclosed is a securing device for a ferrule clamp that has a wing nut, and a method of use thereof, the securing device comprises a top, and a hollow body that extends downwards from a periphery of the top, the hollow body has a front face and a rear face, the front face has an elongated hole configured to receive one end of the wing nut, a first cutout in the front face that extends from a bottom of the hollow body and below the elongated hole, the first cutout has a width more than a width of the ferrule clamp, the rear face of the hollow body has a second cutout configured to receive an opposite end of the wing nut, two flanges extend from opposite edges of the second cutout, each of the two flanges has a hole.

In one implementation, two flanges are parallel to each other. Two holes of the two flanges are configured to permit a shackle to pass through, wherein the shackle limits the movement of the wing nut. The shackle is a shackle of a lock. The lock has a surface for labeling. The hollow body is cylindrical. The top is flat.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Figure 1:
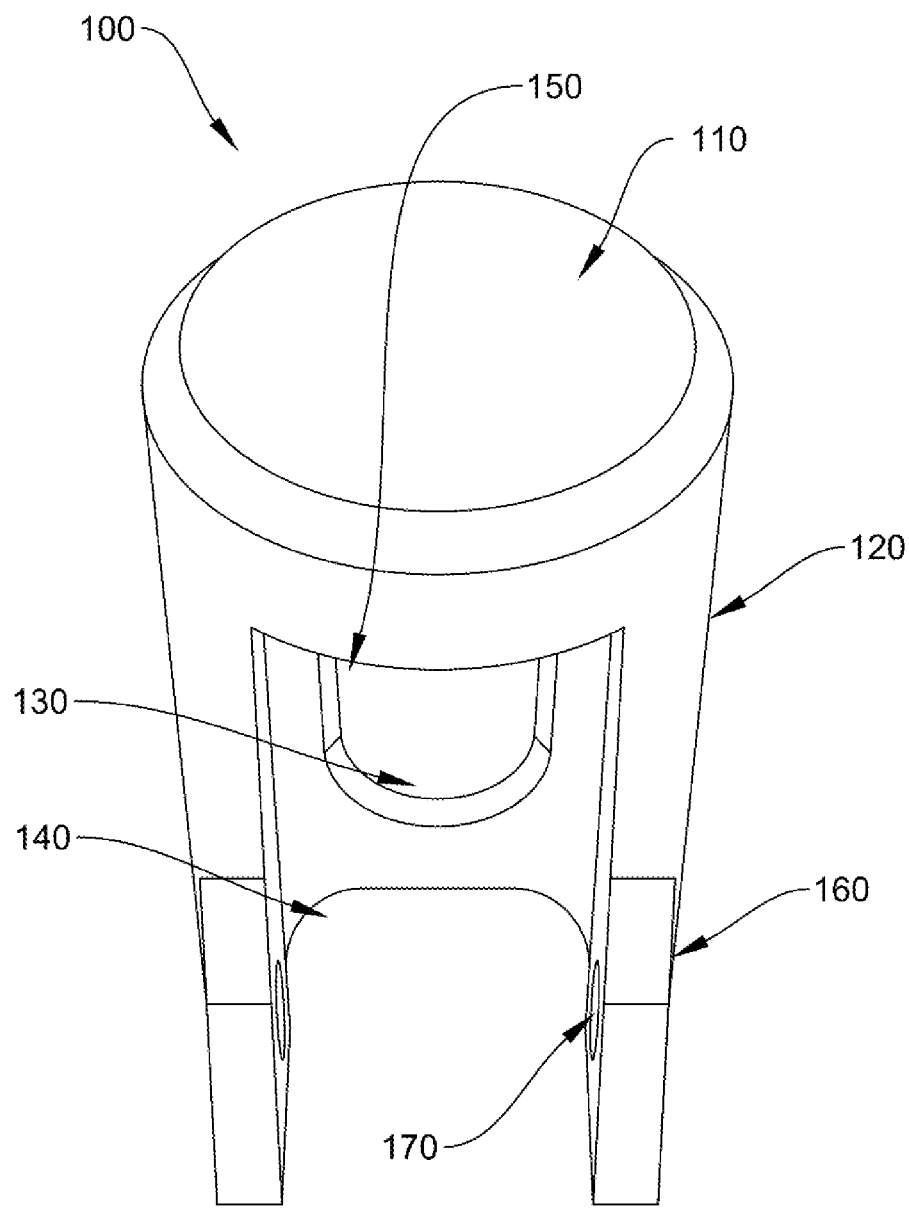
FIG. 1 is a perspective view of the securing device, according to an exemplary embodiment of the present invention.

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as apparatus and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention since the scope of the invention will be best defined by the allowed claims of any resulting patent.

The following detailed description is described with reference to the drawings, wherein like reference numerals are used to refer to like elements throughout. In the following description, for purposes of explanation, specific details may be set forth in order to provide a thorough understanding of the subject innovation. It may be evident, however, that the claimed subject matter may be practiced without these specific details. In other instances, well-known structures and apparatus are shown in block diagram form to facilitate describing the subject innovation. Moreover, the drawings may not be to scale.

Disclosed is a securing device for a ferrule clamp that keeps the ferrule clamp secured from rotation or loosening due to vibrations and oscillations. Referring to FIG. 1 which shows an exemplary embodiment of the disclosed securing device 100 and FIG. 2 which shows the disclosed securing device 100 installed to a ferrule clamp 200. The disclosed securing device 100 can include a top 110 and a hollow body 120 that extends downwards from the top 110. The device 100 further includes a front face and a rear face. The front face has an elongated hole 130 that extends along a length of the hollow body 120. One end of the wing nut of the ferrule clamp can protrude from the elongated hole 130. A cut-out 140 can extend from the bottom of the front face of the hollow body 120. The width of the cut-out 140 can be proportional to the width of the ferrule clamp. A portion of the ferrule clamp that is adjacent to the nut can be received within the cutout 140. An elongated cutout 150 is on the rear face of the hollow body 120 that extends from the bottom up to the top of the hollow body. A pair of flanges 160 extends from opposite edges of the elongated cutout 150. The pair of flanges can be parallel to each other and extends vertically along the length of the hollow body. Each flange of the pair of flanges can have a hole 170, wherein a shackle can pass through the two holes of the two flanges. FIG. 1 shows the hollow body as cylindrical and with a flat top. The pair of flanges extends outwards. On flat top, a label or marking can be placed as and when required.

Figure 2:
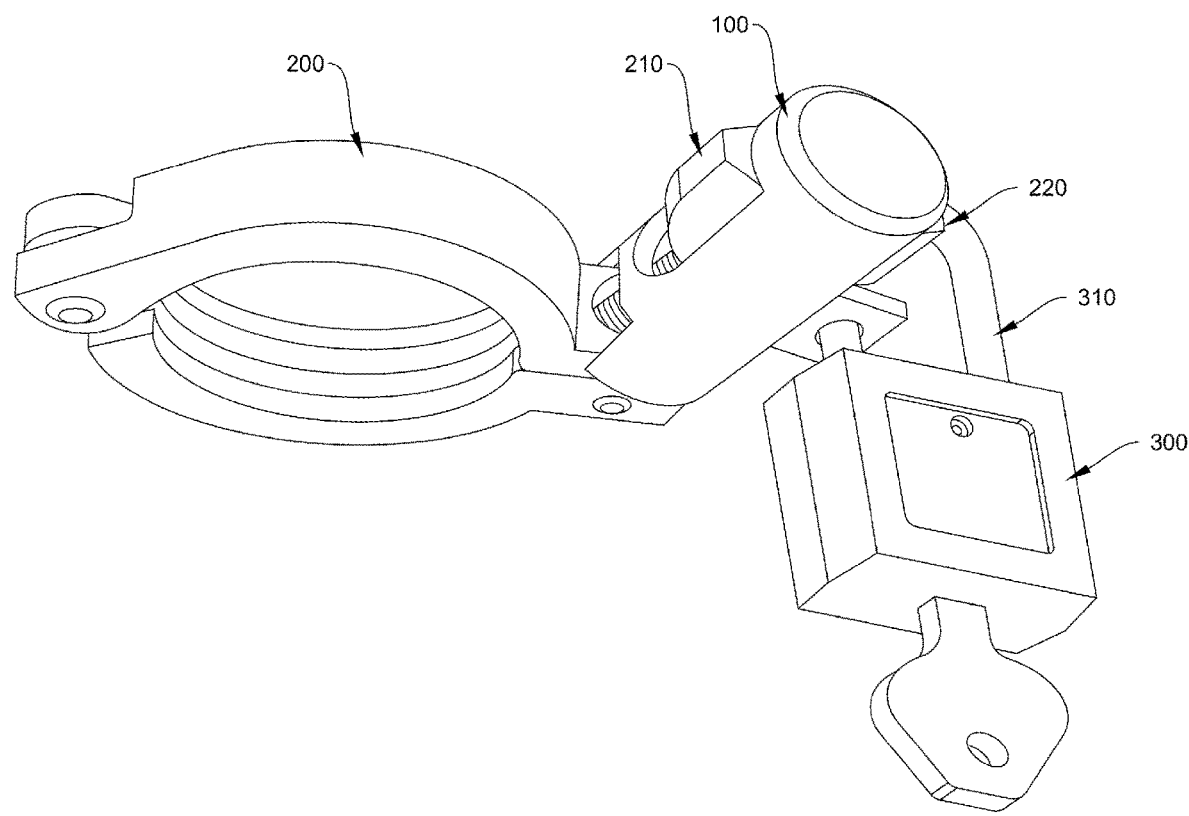
FIG. 2 shows the securing device coupled to a ferrule clamp, according to an exemplary embodiment of the present invention.

As shown in FIG. 2, the disclosed device 100 can be mounted to a ferrule clamp 200. A first end of the wing nut 210 can protrude from the elongated hole 130 and a second end of the wing nut 220 can protrude from the elongated cutout 150. A portion of the ferrule clamp can be retained in the cutout 140. A lock 300 can also be seen in FIG. 2 wherein a shackle 310 of the lock 300 can pass through the two holes 170 of the two flanges 160. The shackle 310 of the lock 300 can secure the wing nut, and thus the ferrule clamp. The shackle can limit the movement of the second end of the wing nut 220. It is understood, however, that instead of shackles, pins, screws, nuts, tie cords, and the like fastening mechanism can also be used, and any such fastener is within the scope of the present invention. In one implementation, the flanges can be replaced by a hook and loop fastener.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A securing device for a ferrule clamp that has a wing nut, the securing device comprises:
    a top, and
    a hollow body that extends downwards from a periphery of the top, the hollow body has a front face and a rear face, the front face has an elongated hole configured to receive one end of the wing nut, a first cutout in the front face that extends from a bottom of the hollow body and below the elongated hole, the first cutout has a width more than a width of the ferrule clamp, the rear face of the hollow body has a second cutout configured to receive an opposite end of the wing nut, two flanges extend from opposite edges of the second cutout, each of the two flanges has a hole.

2. The securing device according to claim 1, wherein the two flanges are parallel to each other.

3. The securing device according to claim 2, wherein the two holes of the two flanges are configured to permit a shackle to pass through, wherein the shackle limits movement of the wing nut.

4. The securing device according to claim 3, wherein the shackle is a shackle of a lock.

5. The securing device according to claim 4, wherein the lock has a surface for labeling.

6. The securing device according to claim 1, wherein the hollow body is cylindrical.

7. The securing device according to claim 1, wherein the top is flat.

8. A method for securing a ferrule clamp coupled to a ferrule, the method comprises:
    providing a securing device for a ferrule clamp that has a wing nut, the securing device comprises:
        a top, and
        a hollow body that extends downwards from a periphery of the top, the hollow body has a front face and a rear face, the front face has an elongated hole configured to receive one end of the wing nut, a first cutout in the front face that extends from a bottom of the hollow body and below the elongated hole, the first cutout has a width more than a width of the ferrule clamp, the rear face of the hollow body has a second cutout configured to receive an opposite end of the wing nut, two flanges extend from opposite edges of the second cutout, each of the two flanges has a hole.

9. The method according to claim 8, wherein the two flanges are parallel to each other.

10. The method according to claim 9, wherein the two holes of the two flanges are configured to permit a shackle to pass through, wherein the shackle limits movement of the wing nut.

11. The method according to claim 10, wherein the shackle is a shackle of a lock.

12. The method according to claim 11, wherein the lock has a surface for labeling.

13. The method according to claim 8, wherein the hollow body is cylindrical.

14. The method according to claim 8, wherein the top is flat.

15. The method according to claim 14, wherein the flat top provides a surface for marking.

\* \* \* \* \*